Patented Aug. 10, 1937

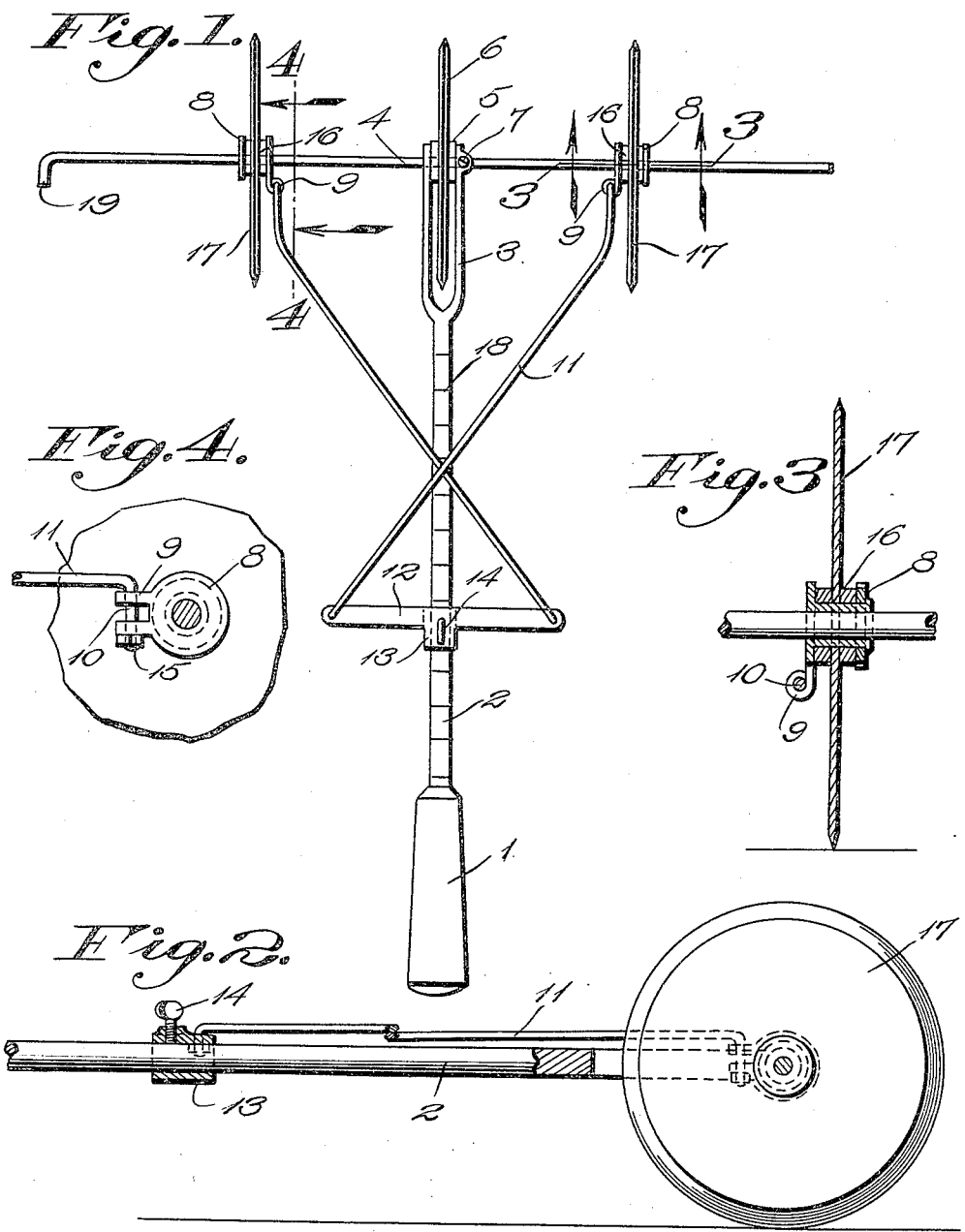

2,089,881

UNITED STATES PATENT OFFICE 2,089,881

ADJUSTABLE DOUGH CUTTER

Hans Martin Wolfgang Döhring, Irwin, Nebr.

Application October 26, 1936, Serial No. 107,679

5 Claims. (Cl. 30—307)

This invention relates to dough cutters, and its general object is to provide a rotary knife cutter of the gang type which is adjustable to cut strips of various widths, as well as designs of various shapes and sizes in an easy and expeditious manner, and with minimum effort on the part of the user.

Another object is to provide a dough cutter of the character set forth, that is readily adjustable to vary the distance between the knives, and is changeable to provide either a gang cutter or a single cutter.

Another object is to provide a dough cutter that is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a top plan view of the cutter which forms the subject matter of the present invention.

Figure 2 is a view partly in section and taken longitudinally of the device.

Figure 3 is a sectional view taken approximately on line 3—3 of Figure 1, looking in the direction of the arrows.

Figure 4 is a sectional view taken approximately on line 4—4 of Figure 1, looking in the direction of the arrows.

Referring to the drawing in detail, the reference numeral 1 indicates the handle of my cutter and which has formed on or otherwise secured thereto to extend from one end thereof, a shank 2 that terminates at its outer end into a bifurcated portion to provide a fork 3 having registering openings in the portions thereof adjacent their outer ends, to slidably receive a rod like shaft 4. Mounted for rotation on the shaft 4 between the portions of the fork is the hub 5 of a rotary knife 6, and the shaft is held against movement in the fork by a set screw 7, as clearly shown in Figure 1.

Mounted for slidable movement on the shaft 4 and disposed upon opposite sides of the fork 3 are grooved bearings 8 which have formed thereon a pair of apertured ears 9 for the purpose of receiving the right angled bent downwardly directed ends 10 of links 11 which extend rearwardly from the bearings 8 and thence inwardly at an inclination to cross each other, as shown in Figure 1, and the opposite ends of the links 11 are likewise downturned and mounted in the ends of a cross strip 12 which has formed thereon midway the ends thereof a collar 13, the latter being slidably mounted on the shank 2 and held in adjusted positions by a set screw 14 provided with a handle.

The ends of the links 11 are screw threaded to receive nuts 15 for detachably securing the links to the cross strip 12 and the ears of the bearings 8, as will be apparent.

Rotatably mounted on the grooved bearings 8 are the hubs 16 of rotary knives 17 which of course are of the same diameter as the rotary knife 6 and all of the knives have beveled outer peripheries, to provide cutting edges.

From the above description and disclosure of the drawing, it will be obvious that the knives 17 are adjustable longitudinally of the shaft 4 for movement toward and away from the knife 6, and the adjustment is brought about merely by sliding the cross strip 12 on the shank 2, it being apparent that the set screw 14 holds the same in adjusted positions. The shank may be provided with graduation marks 18 to provide a gauge for the knives 17, but in any event the adjustment of the knives 17 with respect to the knife 6 makes it possible to cut strips of dough of various widths, and of course designs of various shapes and sizes.

When it is desired to provide a single cutter, the links can be readily removed from the bearings 8 and the cross strip 12 to allow the knives 17 to be removed from the shaft 2, and it will be apparent that the cuter is capable of performing its intended function with the same efficiency, whether or not it is used as a gang cutter or a single cutter.

One end of the shaft 2 may be bent at right angles upon itself to provide a stop 19, to limit the outward movement of the rotary knives 17, as it will be noted from inspection of Figure 1 that the stop 19 is arranged in the path of one of the bearings and as the bearings are connected for movement in unison, through the instrumentality of the links 11 and the cross strip 12, both of the knives are held against movement off of the shaft 4 by the stop 19.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A dough cutter comprising handled means, a shaft detachably secured to the handled means and extending at right angles with respect thereto, a rotary knife journaled on the shaft centrally thereof, rotary knives journaled on the shaft upon opposite sides of the central knife and movable thereon for adjustment toward and away from the central knife, means for moving the adjustable knives in unison and carried by the handled means and means for securing the adjustable knives in adjusted positions.

2. A dough cutter comprising handled means including a fork, a shaft detachably secured to the fork and extending upon opposite sides thereof, a rotary knife journaled between the portions of the fork, rotary knives journaled on the shaft upon opposite sides of the first mentioned knife and movable for adjustment with respect thereto, means slidably mounted on the handled means, means between the slidably mounted means and the movable knives for adjusting the latter in unison, and means carried by the slidably mounted means for securing the movable knives in adjusted positions.

3. A dough cutter comprising handled means including a shank having a forked end, a shaft detachably secured to the forked end and extending upon opposite sides thereof, a rotary knife journaled to the shaft between the portions of the fork, rotary knives journaled to the shaft upon opposite sides of the first mentioned knife and movable for adjustment with respect thereto, a cross piece slidably mounted on the shank, links between the cross piece and the movable knives for adjusting the latter in unison, and means carried by the cross piece for holding the movable knives in adjusted positions.

4. A dough cutter comprising a handle, a shank secured thereto and having a forked outer end, a rod like shaft detachably secured to the fork and extending upon opposite sides thereof, a rotary knife journaled to the shaft between the portions of the fork, rotary knives journaled on the shaft upon opposite sides of the first mentioned knife, bearings for the second mentioned knives and mounted for slidable movement on the shaft for adjustment toward and away from the first mentioned knife, means mounted on the shank for slidable movement longitudinally thereon, links detachably secured to the slidably mounted means and the bearings respectively for moving the second mentioned knives in unison, and means carried by the slidably mounted means and engageable with the shank for holding the second mentioned knives in adjusted positions.

5. A dough cutter comprising a handle, a shank secured thereto and having a forked outer end, a shaft detachably secured to the forked outer end and extending upon opposite sides thereof, a rotary knife journaled to the shaft between the portions of the fork, rotary knives journaled on the shaft upon opposite sides of the first mentioned knife and movable thereon for adjustment with respect to the first mentioned knife, bearings for the movable knives, a cross strip mounted for movement longitudinally on the shank, links having downturned ends detachably secured to the bearings and the cross strip respectively for moving the second mentioned knives in unison, gauge means for the cross strip, means carried by the cross strip and engageable with the shank for holding the second mentioned knives in adjusted positions, and means to limit the movement of the second mentioned knives.

HANS MARTIN WOLFGANG DÖHRING.